Patented Dec. 23, 1941

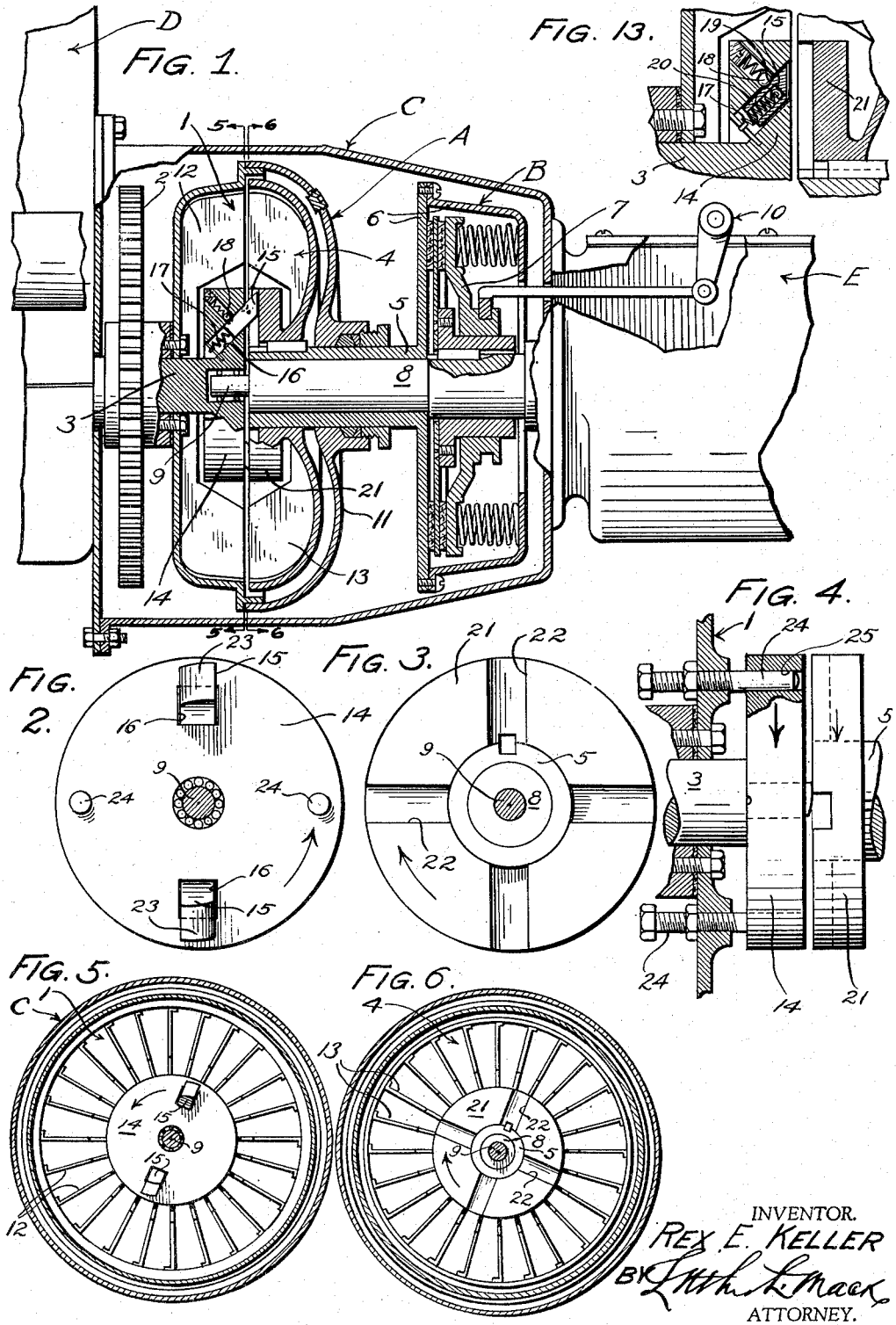

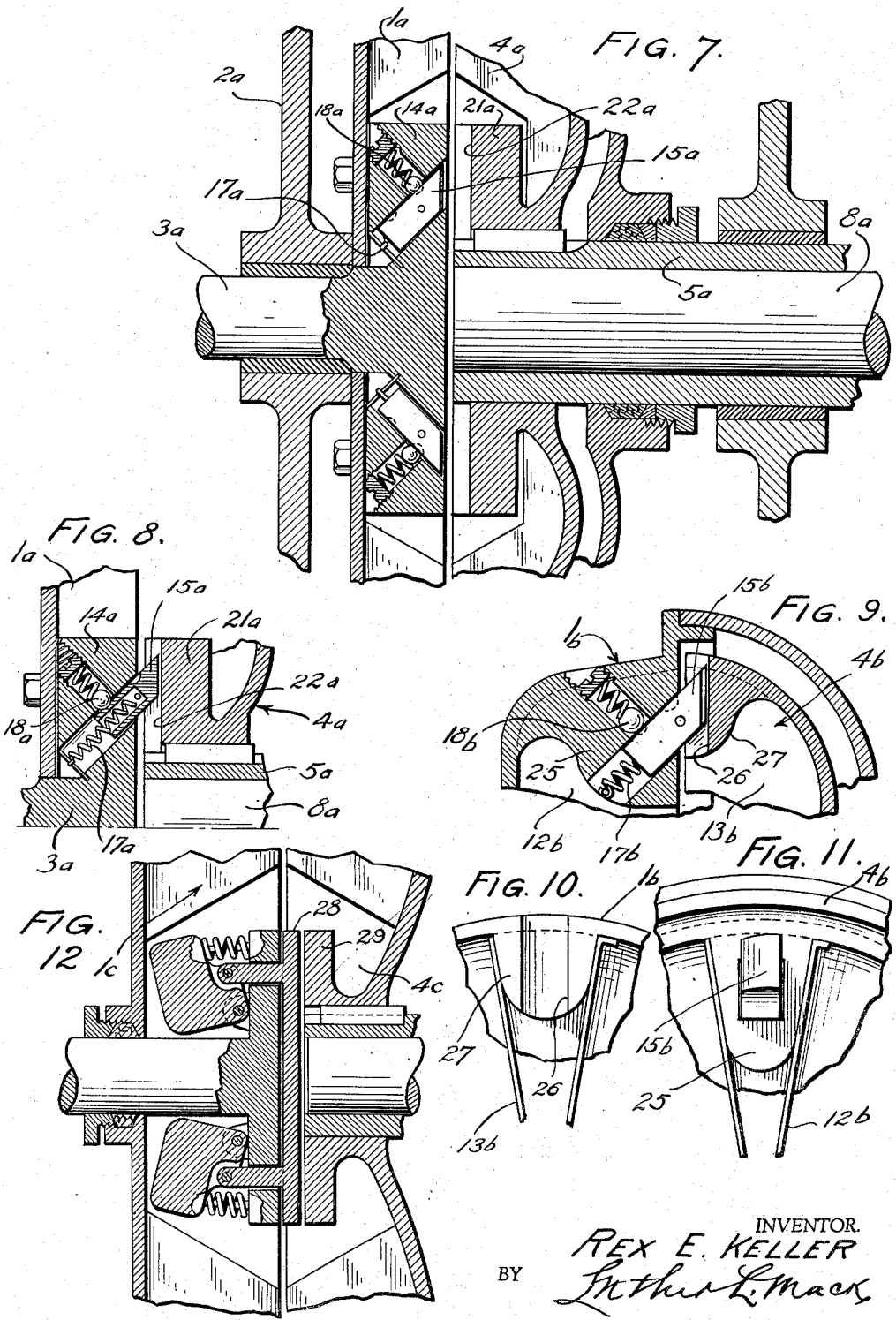

2,267,334

UNITED STATES PATENT OFFICE 2,267,334

AUTOMATIC LOCKUP FOR FLUID DRIVE CLUTCHES

Rex E. Keller, Beverly Hills, Calif.

Application September 13, 1939, Serial No. 294,695

15 Claims. (Cl. 192—3.2)

This invention relates to and has for an object the provision of an automatic lock-up mechanism for operation in connection with what is generally referred to in the art as a "fluid drive" or "a fluid clutch," wherein power is applied through a fluid medium from a driving member to a driven member without physical connection of said members.

In the operation and use of fluid clutches or drives of this character, particularly in motor vehicles, there is a tendency under all conditions for slippage between the driving and driven member and consequent loss of efficiency. This is especially the case when the motor is under a heavy load, as when ascending a hill or when a sudden demand is made on the motor for an increased effort. Hence it is the object of my invention to provide a means for establishing a physical connection between the driving and driven members of a fluid drive upon the attainment of a predetermined speed or when a predetermined condition is reached, for locking the driving and driven members together for the duration of such predetermined speed or condition whereby to prevent slippage and assure maximum efficiency when power is most needed whether in a motor vehicle or other power operated apparatus.

As generally constructed a fluid drive or clutch of a type which has recently come into use, embodies a pair of saucer-like members having opposed concave faces arranged to contain a fluid which constitutes the driving medium therebetween. One of these members known as the "impeller" is connected to the driving shaft of a motor or other prime mover, and the other known as the "runner" is connected with an element to be driven, for example the driving shaft of a variable speed transmission. These members are provided with opposed vanes or blades which co-act whereby the fluid displaced by the blades on the impeller will impinge against the blades of and thereby drive the runner.

In accordance with my invention a mechanical clutch or lock-up device is associated with the impeller and runner so as to establish automatically a positive driving connection therebetween when the impeller and runner attain a given speed of rotation, and for releasing said impeller and runner for operation as a fluid clutch when operated at other speeds. I may use a centrifugally operated clutch of the type shown in Letters Patent of the United States No. 1,969,560 issued August 7, 1934, which is well known to the automotive industry and generally referred to as the "Keller clutch" or may in fact use any clutch, or lock-up means which will operate automatically as herein noted, responsive to given speeds. Consequently the term "lock-up device" as herein used, covers any means which will establish a physical connection between the driving and driven members of a fluid clutch whereby to provide a positive drive instead of one relying solely upon a fluid medium. In all cases the lock-up device as constituted will include a means mounted to rotate with the impeller, a co-acting means arranged to rotate with the runner, and provisions whereby these means will engage or co-act automatically by centrifugal action and thereby establish a mechanical connection between the impeller and runner when the latter are operated at predetermined speeds as aforesaid. The arrangement is preferably such that the lock-up device does not impair the operation of the fluid drive medium and will provide a drive connection in addition to that of the fluid medium. Under these conditions it is apparent that before the lock-up device is operated and also when it is released at speeds other than said predetermined speed, the impeller and runner are subject to a fluid drive connection only.

My invention also includes the provision in a fluid clutch of the character described, of an emergency drive means which may be operated to effect a driving connection of the impeller and runner in the event of the failure of the fluid clutch due to leakage therefrom of the drive fluid, or other causes.

In the accompanying drawings I have shown a preferred form of automatic lock-up for fluid drive clutches, subject to modification within the scope of the appended claims, without departing from the spirit of my invention.

Referring to the drawings:

Fig. 1 is a fragmentary sectional view of apparatus embodying my invention as when associated with a typical automotive fluid drive installation.

Fig. 2 is an elevational view of one form of impeller carried clutch means of my invention.

Fig. 3 is an elevational view of the runner carried clutch means for cooperation with the clutch means of Fig. 2.

Fig. 4 is top plan view of the two clutch means of my invention as when operatively related.

Fig. 5 is a vertical section taken on the line 5—5 of Fig. 1.

Fig. 6 is a vertical section taken on the line 6—6 of Fig. 1.

Fig. 7 is an enlarged fragmentary sectional view of my invention as when applied to a modified form of fluid clutch.

Fig. 8 is an enlarged fragmentary sectional view of the clutch of my invention as when locking up the impeller and runner of the fluid drive shown in Fig. 7.

Fig. 9 is an enlarged fragmentary section of a modified form of my invention.

Fig. 10 is a fragmentary front elevation of the impeller carried clutch means of the form of clutch shown in Fig. 9.

Fig. 11 is a fragmentary front elevation of the runner carried clutch means for cooperation with the impeller carried clutch means shown in Fig. 10.

Fig. 12 is a fragmentary sectional view of another modified form of my invention.

Fig. 13 is a fragmentary detail section of the lock-up means, shown on a larger scale than in Fig. 1.

As shown in the accompanying drawings apparatus of my invention is associated with a typical automotive drive mechanism having a fluid clutch A, and a manually operable friction clutch B mounted in a housing C between the motor D and a selective transmission apparatus E. The fluid clutch A includes a saucer-like driving member or impeller 1 mounted to rotate with the flywheel 2 on the driving shaft 3 of the motor and a similar member or runner 4 opposed to the impeller and fixed for rotation with a tubular driven shaft 5. The elements 6 of the clutch B are fixed to rotate with the shaft 5, whereas the cooperating clutch elements 7 are associated with the driving shaft 8 for the transmission E. The driving shaft 8 supports the tubular shaft 5 and has a pilot bearing 9 in the shaft 3. A manually operable means 10 provides for operating the clutch E and it is now apparent that the runner 4 of the fluid clutch is adapted to be drivingly connected with the transmission shaft 8 through the clutch E.

A saucer-like cover member 11 is freely rotatable on the shaft 5 and telescopes the outer margin of the impeller 1 for forming therewith an enclosure for oil or other suitable fluid, the runner 4 being spaced from the cover member and rotatable relative thereto. The oil or other fluid serves as the driving medium between the impeller and runner. The blades or vanes 12 and 13 carried by the impeller and runner respectively are so arranged that the fluid displaced by the blades of the impeller will impinge upon the blades of and rotate the runner whereby to effect a fluid drive between the motor and transmission, or the driving and driven elements as the case may be, it being obvious that this fluid drive could be used for other purposes and in drive means other than for motor vehicles.

In accordance with my invention I provide a lock-up device or clutch means, which will automatically establish a positive drive connection between the impeller and runner in addition to the fluid drive medium, responsive to the attainment of a given speed of rotation by the impeller and runner or either of them. The lock-up drive generally comprises a means carried by the impeller and a cooperating means carried by the runner, together with provisions whereby these means will automatically co-act as aforesaid to establish a positive driving connection between the impeller and runner.

As here shown the impeller carried lock-up means comprises a circular disc or plate 14 fixed to the driving shaft 3 within the concave side of the impeller and one or more centrifugally operable lock-up bolts 15 slidable in inclined slots 16 so that they will extend outwardly from the outer face of the disc, against the action of springs 17 fixed thereto and to the disc. Cooperating with the bolts 15 are spring urged detents or tappets 18 operating against the sides of the bolts and adapted to seat in depressions 19 and 20. These depressions resist centrifugal movement of the bolts so that the bolts will quickly move with a snap action into and out of lock-up position.

The runner carried clutch or lock-up means includes a disc or plate 21 fixed to the tubular shaft 5 and runner or within the latter in any manner whereby to rotate therewith. In the disc 21 are a plurality of radial grooves or slots 22 adapted to receive the bolts 15 whereby to drivingly couple the impeller with the runner. It is now seen that the clutch elements of my invention lie within the concave sides of the impeller and runner in opposed but spaced relation so as not to interfere with the fluid drive action between the impeller and runner.

The purpose of my invention being to prevent slippage and loss of efficiency of the fluid clutch or drive means, it is apparent that the springs 17 and springs of the detents 18 will have such tension that when the motor or driving member is placed under heavy load or suddenly called upon for an increased effort, the centrifugal action of the bolts 15 will overcome the tension of said springs whereby the bolts will extend angularly outwardly from the member 14 and seek engagement in the grooves 22 of the runner carried member 21. However, the bolts will not enter the grooves until the impeller and runner attain a synchronous rotation, even though the speed of rotation of the member carrying the bolts is at or above that necessary to centrifugally project or extend the bolts. This is due to cam or inclined faces 23 on the outer ends of the bolts, said cam faces cooperating with the edges of the grooves 22 in such manner that when the runner and impeller are rotated at different speeds the bolts are cammed out of the grooves before they have been lined up with said grooves for sufficient length of time to be extended fully into the grooves.

As here provided the fluid drive medium will in some instances establish synchronous rotation of the impeller and runner at such speeds as to centrifugally extend the bolts and thereby automatically connect the impeller and runner for a positive drive in addition to the drive connection afforded by the fluid medium. This will cause a drive without slippage between the driving and driven members, whereby maximum driving efficiency and full transmission of power are assured at such times as most needed.

When necessary the operator by decelerating the motor may reduce the speed of the driving member (impeller) to that of the driven member (runner) and thereby cause a positive lock-up of these members as aforesaid providing the speed of rotation thereof is such that centrifugal force will overcome the tension of the springs and cause the bolts 15 to extend into lock-up position.

While I have shown the bolts 15 as carried by the driving member, it is to be understood that they could be carried on the driven member to the same purpose and effect.

For the purpose of drivingly connecting the impeller and runner in the event of failure of operation thereof due to leakage of the driving fluid from between such member, or other causes, I provide a manually operable means for locking the impeller carried member 14 with the runner carried member 21. As here shown one form of such a means may comprise one or more bolts 24, threadedly supported on the impeller as shown in Fig. 4 and extensible through openings 25 in the member 14 so that they may be engaged in the grooves 22 in the member 21. Should it become necessary to use this emergency drive means the operator with a suitable tool may screw the bolts 24 inwardly and turn the motor over by hand to line up such bolts with the grooves 22, then further adjust the bolts to cause them to extend into the grooves 22 as aforesaid.

In Figs. 7 and 8, I have shown my lock-up means applied to a modified form of fluid clutch wherein the impeller 1a and runner 4a have outside bearings instead of a pilot bearing as in the clutch shown in Figs. 1 to 6 inclusive. This leaves a free space between the impeller and runner carried discs 14a and 21a. In all other respects the arrangement is the same as shown in Figs. 1 to 6 inclusive and the elements of my lock-up device are here identified by the same reference characters with the character "a" added thereto.

In Figs. 9, 10 and 11, I have shown my lock-up means as arranged adjacent the outer peripheries of the impeller 1b and runner 4b. The bolts 15b are mounted in bosses or enlargements 25 on the impeller and adapted to seat in grooves or slots 26 formed in similar enlargements or bosses 27 on the runner. Detents 18b corresponding to the ones 18 are here used for the same purpose as are also springs 17b which correspond to springs 17. This form of my invention will operate in the same manner as the form shown in Figs. 1 to 6 inclusive. With this arrangement discs corresponding to the ones 14 and 21 are not required, and therefore this modification consists of fewer parts and may in some instances be preferred. The bosses 25 and 26 lie between and do not interfere with the blades 12b and 13b of the impeller and runner respectively as shown in Figs. 10 and 11.

Another form of my invention as shown in Fig. 12 comprehends the use in a fluid clutch of the same type as shown in Fig. 1, of a friction clutch lock-up means, between the impeller 1c and runner 4c. As here provided the friction clutch comprises cooperating clutch discs 28 and 29 mounted for rotation with the impeller and runner respectively. The disc 28 is movable axially into and out of driving contact with disc 29 and is supported on a plate 30 fixed to the driving shaft 3c. Springs 31 operating through pivoted levers 32 normally hold the plate 28 out of contact with plate 29. When a predetermined speed of rotation is attained by the impeller 1c the levers 32 swing outwardly by centrifugal force, overcome the tension of the springs and then move the disc 28 into clutching contact with plate 29. It is now seen that at predetermined speeds, this friction clutch serves as a lock-up for the impeller and runner of the fluid clutch to prevent slippage and assure a positive drive. With this form of lock-up device the driving and driven members do not have to rotate at the same speed. While the movable clutch disc 28 is here shown on the impeller it is obvious that it could be mounted on the runner and in that event would operate only responsive to a given speed of the driven element.

I claim:

1. In combination, a fluid drive mechanism including driving and driven members having a fluid contained therein and operable therebetween as a driving means; and a lock-up device associated with said members including a bolt adjustable on one of said members relative to the other member and operable by centrifugal force when said members are synchronously rotated at a predetermined speed for establishing a positive driving connection between said members.

2. In combination, a fluid drive mechanism including driving and driven members having a fluid contained and operable therebetween as a driving means; and a lock-up device associated with said members and operable by centrifugal force when said members are synchronously rotated at a predetermined speed for establishing a positive driving connection between said members, said device including a grooved element carried by one of said members, a centrifugally movable bolt carried by the other of said members and adapted to be extended into a groove of said grooved element, and means normally holding said bolt retracted and yielding to centrifugal extension of the bolt when the bolt carrying member is rotated at a given speed.

3. In combination, a fluid drive mechanism including driving and driven members having a fluid contained and operable therebetween as a driving means; and a lock-up device associated with said members and operable by centrifugal force when said members are synchronously rotated at a predetermined speed for establishing a positive driving connection between said members, said device including a grooved element carried by one of said members, a centrifugally movable bolt carried by the other of said members and adapted to be extended into a groove of said grooved element, and means normally holding said bolt retracted and yielding to centrifugal extension of the bolt when the bolt carrying member is rotated at a given speed, said bolt having a cam surface for cooperation with said grooved element to prevent extension of the bolt into the groove of said element while the said members are relatively rotated.

4. In combination, a fluid drive mechanism including driving and driven members having a fluid contained and operable therebetween for drivingly coupling said members, and a lock-up device associated with said members and including separate means carried by said members and means associated with one of said members and operating responsive to centrifugal force when said one member attains a predetermined speed and is rotated in synchronism with the other member, for moving said separate means into driving contact for establishing a positive drive connection between said members.

5. A clutch mechanism comprising a pair of rotatably opposed fluid connected members connected, respectively, with a driving element and a driven element, and a centrifugally operated clutch interposed between said fluid connected members and including two clutch elements positively connected, respectively, with said fluid connected members, and cooperating locking means on said clutch elements adapted for drivingly connecting said members when said clutch elements are synchronously rotated and said clutch has attained a predetermined speed.

6. A clutch mechanism comprising: a motor having a driving shaft, a driven shaft arranged for rotation by said driving shaft, a fluid clutch interposed between and having members positively connected with said shafts, respectively, and a lock-up clutch interposed between said fluid clutch members and including two members positively connected, respectively, with the driving and driven members of said fluid clutch, said lock-up clutch being normally inoperative for connecting the members of said fluid clutch, and cooperating means carried by said lock-up clutch members for positively connecting said lock-up clutch members and through said lock-up clutch for thereby positively connecting said fluid clutch members upon the attainment of a predetermined synchronous speed of rotation.

7. In combination, a fluid drive mechanism including driving and driven members having a fluid operable therebetween as a driving medium therefor, and a lock-up device associated with said members for establishing a positive driving connection therebetween, including a bolt receiving element on one of said members, a bolt on the other of said members movable into and out of positive driving engagement with said bolt receiving element, and a cam portion on said bolt for cooperation with said bolt receiving element to hold said bolt against movement into positive driving engagement with said element while said members are relatively rotated.

8. In combination, a fluid drive mechanism including driving and driven members having a fluid driving medium therebetween, and a lock-up device associated with said members for establishing a positive driving connection therebetween, including a bolt carried by one of said members for movement into and out of position for positively locking said members together for joint rotation; said lock-up device being arranged, when said members are relatively rotated, to prevent movement of the bolt into position for positively locking said members for joint rotation, and to release said bolt when said members are rotated at substantially the same speed.

9. In combination, a fluid drive mechanism including driving and driven members, a lock-up device associated with said members for establishing a positive driving connection therebetween, said lock-up device including a locking element carried by one of said members for movement into position for positively locking said members together for joint rotation, said lock-up device being adapted to prevent movement thereof into position for locking said members together when said members are rotated at relative speeds and to release said locking element for movement to lock said members together when the latter are rotated at substantially the same speed.

10. In combination, a fluid drive mechanism including driving and driven members, and a lock-up device associated with said members for establishing a positive driving connection therebetween including a bolt having associated means whereby said bolt is movable in two stages to reach a position for positively locking said members together for joint rotation, the first stage of movement of said bolt being towards but terminating short of final position which locks the members together, and the second stage movement being such as will lock said members together, said lock-up device, when said bolt attains its first stage position, being adapted to prevent movement of the bolt into lock-up position while said members are relatively rotated and to release said bolt for movement into lock-up position when said members are synchronously rotated.

11. In combination, a fluid drive mechanism including driving and driven members having a fluid medium contained therein and at all times subject to operation therebetween as a driving medium, a lock-up element carried by one of said members for movement into positive driving engagement with the other element and a cam portion on said element operating to prevent movement of said element into lock-up position while the members are relatively rotated and to release said element for movement into lock-up position when said members are rotated at substantially the same speed.

12. In combination, a fluid drive mechanism including driving and driven members having a fluid driving medium therebetween, and a lock-up device associated with said members for establishing a positive mechanical drive connection therebetween without impairing the driving propensities of the fluid driving medium, said lock-up device including a shiftable lock-up element carried by one of said members for movement into and out of positive driving engagement with the other of said members, said lock-up device also including means depending upon contact of said lock-up element with said other member for preventing movement of the lock-up element into lock-up position while said members are rotated at different speeds and releasing said lock-up element for movement into lock-up position when said members attain substantially the same rate of speed.

13. In combination, a pair of opposed rotatable fluid connected drive members, opposed clutch members connected with said drive members, a lock-up device for automatically locking said clutch members and another lock-up device carried by one of said drive members and operable exteriorly thereof for locking said clutch members together, independently of the first named lock-up device.

14. In combination, a fluid drive mechanism including opposed rotatable fluid connected members, a clutch member connected with each of said fluid connected members for rotation therewith, a lock-up device for locking the clutch members together, and another lock-up device operable independently of the first named lock-up device for locking said clutch members together.

15. In combination, a fluid drive mechanism including opposed rotatable fluid connected members, clutch members mounted for rotation with said fluid connected members, a lock-up device associated with said clutch members and operable when said clutch members attain a predetermined speed and another lock-up device for positively connecting said clutch members.

REX E. KELLER.